No. 756,919. PATENTED APR. 12, 1904.
E. C. WASHBURN.
DRAFT RIGGING.
APPLICATION FILED DEC. 11, 1903.
NO MODEL. 3 SHEETS—SHEET 1.

Witnesses.
A. H. Opsahl.
H. D. Kilgore

Inventor.
Edwin. C. Washburn
By his Attorneys.
Williamson Merchant

No. 756,919. PATENTED APR. 12, 1904.
E. C. WASHBURN.
DRAFT RIGGING.
APPLICATION FILED DEC. 11, 1903.
NO MODEL. 3 SHEETS—SHEET 3.

Witnesses
A. H. Opsahl.
H. D. Kilgore.

Inventor.
Edwin C. Washburn.
By his Attorneys
Williamson & Merchant

No. 756,919. Patented April 12, 1904.

UNITED STATES PATENT OFFICE.

EDWIN C. WASHBURN, OF MINNEAPOLIS, MINNESOTA.

DRAFT-RIGGING.

SPECIFICATION forming part of Letters Patent No. 756,919, dated April 12, 1904.

Application filed December 11, 1903. Serial No. 184,754. (No model.)

*To all whom it may concern:*

Be it known that I, EDWIN C. WASHBURN, a citizen of the United States, residing at Minneapolis, in the county of Hennepin and State of Minnesota, have invented certain new and useful Improvements in Draft-Rigging; and I do hereby declare the following to be a full, clear, and exact description of the invention, such as will enable others skilled in the art to which it appertains to make and use the same.

My present invention relates particularly to draft-riggings for cars, engines, and tenders, and has for its especial object to provide an improved frictional retarding device for relieving the springs of the draft-rigging from the heavy impacts or blows which are frequently delivered thereto in the bumping and draft strains.

To the above ends the invention consists of the novel devices and combinations of devices hereinafter described, and defined in the claims.

The invention is illustrated in the accompanying drawings, wherein like characters indicate like parts throughout the several views.

Figure 1:
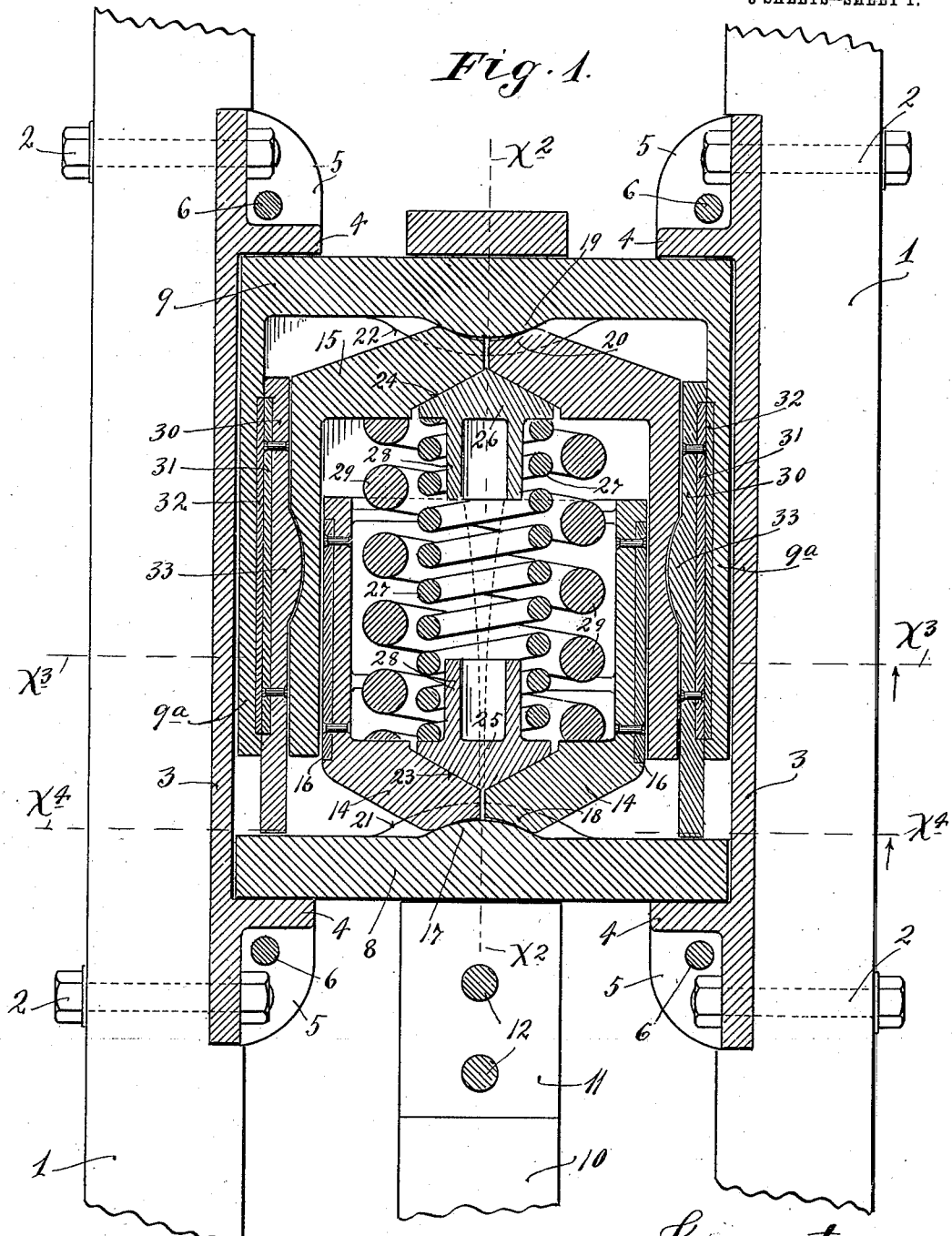
Figure 2:
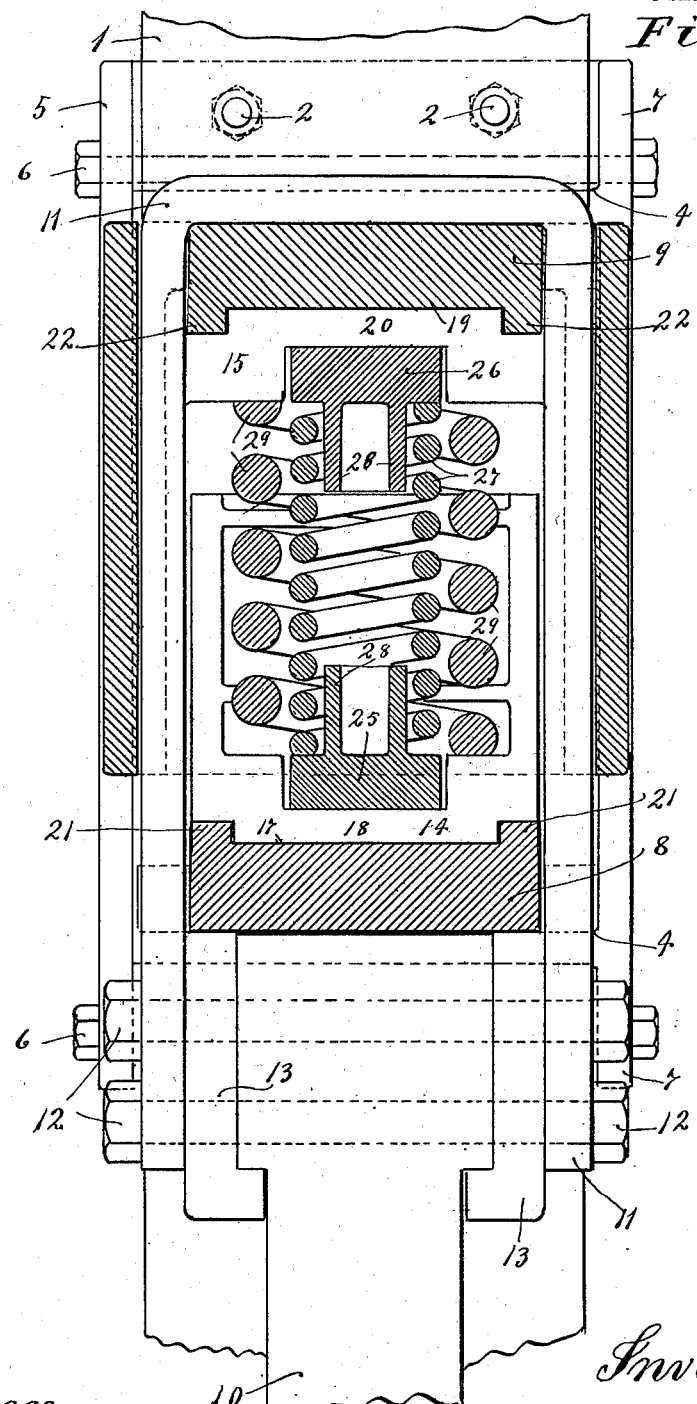
Figure 3:
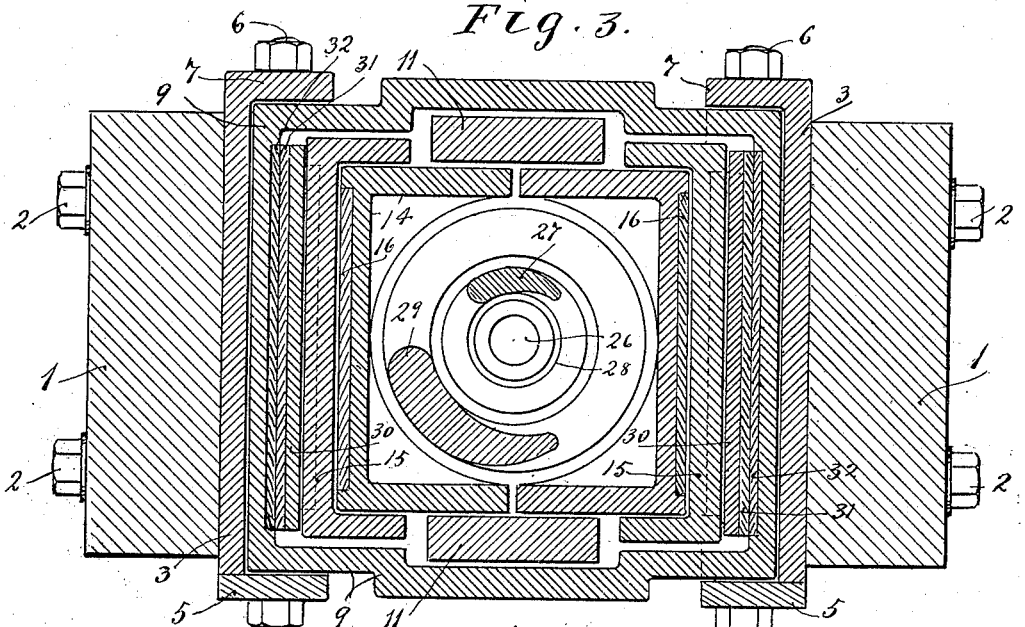
Figure 4:
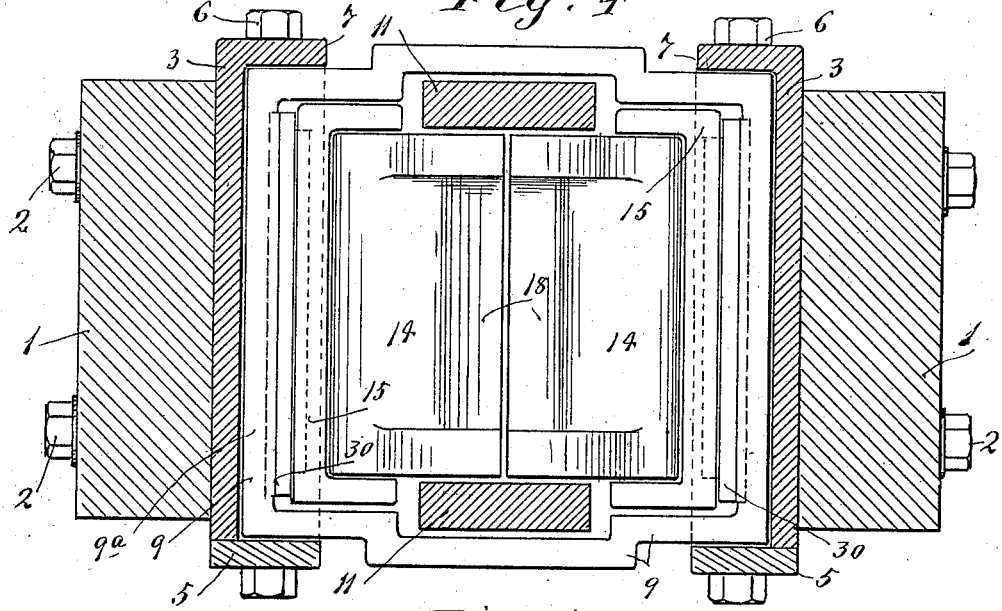
Figure 5:
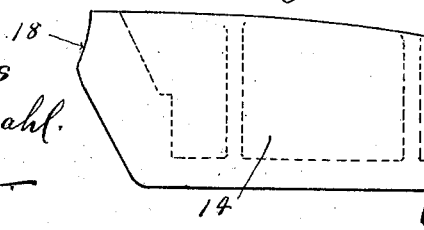

Figure 1 is a view, partly in plan and partly in horizontal section, showing my improved draft-rigging applied to the draft-timbers of a car. Fig. 2 is a vertical section taken approximately on the line $x^2 x^2$ of Fig. 1, some parts being left in full. Fig. 3 is a transverse vertical section on the line $x^3 x^3$ of Fig. 1. Fig. 4 is a transverse vertical section on the line $x^4 x^4$ of Fig. 1; and Fig. 5 is a detail in plan, showing one of the fulcrum members of the innermost supplemental follower or divided fulcrum-spring housing.

The numeral 1 indicates the draft-timbers of the car, to which by means of bolts 2 are rigidly secured draft-lug plates 3, having draft-lugs 4. At their lower edges the lug-plates 3 are provided with detachable follower-supporting bars 5, rigidly secured thereto by nutted bolts 6, shown as passed through the said bars 5 and through the upper flanges 7 of the said plates.

Followers 8 and 9 rest on the bars 5 and coöperate the former with the forward draft-lugs 4 and the latter with the rearmost draft-lugs 4. Both of the followers in a direction transverse of the draft-rigging are rectangular, and the member 9 is made approximately cup-shaped by a deep rectangular flange $9^a$.

The numeral 10 indicates the draft-bar of the coupler, and the numeral 11 indicates the draft yoke or stirrup, which parts are rigidly connected by nutted bolts 12, spacing-plates 13 being interposed between, as shown in the drawings. The prongs of the yoke 11 are passed through perforations in the end of the follower 9 and in notches formed in the upper and lower edges of the follower 8, as best shown in Fig. 2. The inner end of the draft-bar 10 butts against the follower 8.

For coöperation with each follower proper I provide a supplemental follower in the nature of a divided spring-housing, the sections of which are fulcrumed and frictionally engage the corresponding members of the coöperating divided supplemental follower.

The numeral 14 indicates the fulcrum members of the divided housing or supplemental follower which coöperates with, or rather is supplemental to, the follower 8, while the numeral 15 indicates the members of the divided housing which is supplemental to the follower 9. The members 14 telescope within and frictionally engage with the members 15, and, as shown, are provided with hardened chafing-plates 16. The follower 8 is formed with a vertically-extended inwardly-bulged fulcrum-ridge 17, which engages with outwardly-diverging fulcrum-surfaces 18, formed at the adjacent end portions of the fulcrum frictional members 14, and likewise the follower 9 is formed with inwardly-bulged vertically-extended fulcrum-ridge 19, that engages with outwardly-diverging fulcrum-surfaces 20, formed on the adjacent end portions of the fulcrumed frictional members 15. Horizontally-extended flanges 21 and 22 on the followers 8 and 9, respectively, hold the coöperating fulcrum members of the supplemental or divided followers against vertical movements. It will be here noted that the frictionally-engaging surfaces of the fulcrumed follower members 14 and 15 are flat and, as shown, extend vertically. The said follower members 14, at their abutting portions, are also formed with interior inwardly-diverging beveled surfaces 23, and likewise the members 15, at their abutting portions, are formed with interior inwardly-diverging beveled surfaces 24. A wedge-shaped spring-base 25 engages the said beveled surfaces 23, and a similar wedge-shaped spring-base 26 engages the said beveled surfaces 24. A coiled spring 27 is compressed between the said wedge-shaped spring-bases 25 and 26 and is held in position by sleeve-like projections 28 thereof. A primary coiled spring 29 is compressed between the fulcrumed members 14 and the fulcrumed members 15.

Between the flat outer facing of the fulcrumed members 15 and the adjacent flat inner surfaces or sides of the follower 9 are interposed friction-plates 30, which, as shown, have hardened chafing-plates 31, that engage with hardened chafing-plates 32, set into the sides $9^a$ of the follower 9. At their forward ends the interposed friction-plates 30 project for engagement with the follower 8. Each friction-plate 30 has an intermediate lateral bulge or cam-surface 33, that engages with a correspondingly-formed depression in the side of the adjacent fulcrumed section 15 for a purpose which will presently appear.

The operation of the device described is substantially as follows: The tension of the spring 29, acting on the fulcrumed members 14 and 15, tends to rock the same outward or laterally on their fulcrumed surfaces 18 and 20, respectively, and such movements tend to force the members 14 into engagement with the members 15 and the members 15 into engagement with the friction-plates 30. The tension of the spring 27, pressing on the wedge-shaped spring-bases 25 and 26, causes the said bases to act, respectively, on the interior beveled surfaces 23 and 24 with a wedging action which spreads or separates the said fulcrumed members at their bases or fulcrumed ends. Furthermore, the tension of both of the springs causes the fulcrum-ridges 17 and 19 to act, respectively, on the fulcrum-surfaces 18 and 20 to assist the said wedge-shaped spring-bases in their tendency to separate the coöperating fulcrumed members at their bases or fulcrumed ends. In this way the fulcrumed members 14 and 15 are mounted for movements which tend to maintain complete flat engagements between their frictionally-engaging surfaces. Furthermore, under bumping strains when the follower 8 is pressed rearward and the split or divided supplemental follower made up of the fulcrumed sections 14 are moved telescopically within the members 15 the friction-plates 30 will also be forced rearward. When the friction-plates 30 are moved rearward, as above stated, or when they are moved forward for that matter, their cam bulges 33, acting on the depressions of the fulcrumed members 15, force the latter inward onto the fulcrumed members 14. It will thus be seen that the fulcrumed members 15 are subjected to two forces, one tending to move them inward and the other tending to move them outward, and are, as it were, pinched between the fulcrumed members 14 and friction-plates 30.

Under draft strains the follower 9 and the supplemental follower made up of the fulcrumed members 15 are moved forward, while the follower 8, friction-plates 30, and divided supplemental follower 14 become the relatively fixed member to resist the movements of the said members 9 and 15 under an action which is substantially identical with that which takes place under bumping strains. Under both bumping and draft strains the springs are greatly relieved by the sliding frictional engagements between the several parts noted.

From what has been said it will be understood that the device described is capable of considerable modification within the scope of my invention as herein set forth and claimed.

What I claim, and desire to secure by Letters Patent of the United States, is as follows:

1. In a draft-rigging, the combination with a pair of primary followers, one thereof having frictional flanges, of a pair of divided supplemental followers, telescoping one within the other and made up of fulcrumed frictionally-engaging sections, one pair of which sections have their base of reaction against the frictional flanges of the one follower, and a spring compressed between the divided supplemental followers and tending to maintain frictional engagement between said parts.

2. The combination with parts to be cushioned, of a pair of divided frictional followers, made up of fulcrumed frictional sections, said followers telescoping one within the other, a spring compressed between said divided followers, and frictional members against which the sections of the outer divided follower are frictionally pressed, substantially as described.

3. A frictional spring-retarding device comprising a pair of telescoping members, at least one of which is made up of a pair of fulcrumed sections, and a yielding device compressed between said members and tending to separate the sections of said divided follower, both at their free and at their fulcrumed ends, substantially as described.

4. A frictional retarding device comprising a pair of frictionally-engaging members, at least one of which members is made up of a pair of fulcrumed sections, a wedge applied to the fulcrumed ends of said fulcrumed sections, and a spring compressed between the said frictional members and acting on the said wedge, said wedge and spring tending to separate said fulcrumed sections, both at their free ends and at their fulcrumed ends, substantially as described.

5. The combination with a pair of followers, of a pair of supplemental followers, applied, one to each thereof, said supplemental followers comprising fulcrumed frictionally-engaging surfaces, wedges acting on the fulcrumed ends of said fulcrumed members, and a spring compressed between the said wedges, and operating thereon, substantially as described.

6. The combination with a pair of primary followers and a pair of supplemental divided followers, said supplemental followers having engagements with said primary followers, tending to separate the sections thereof at their fulcrumed ends, and a spring compressed between the said supplemental followers, and acting thereon, substantially as described.

7. A frictional spring-retarding device comprising a pair of telescoping frictional members, at least one of which is made up of a pair of fulcrumed sections, a wedge engaging diverging surfaces formed on the base of said fulcrumed sections, for spreading them, and a spring compressed between said telescoping frictional members, and acting on the said wedge, substantially as described.

8. A frictional retarding device comprising a pair of telescoping members, one thereof having frictional flanges, of a pair of supplemental followers, each made up of a pair of fulcrumed frictionally-engaging sections, friction-plates interposed between the outer fulcrumed sections and the flanges of one of the said primary followers, and subject to one of the followers, and a spring compressed between the said supplemental followers, substantially as described.

9. The combination with a pair of followers and supplemental divided followers, made up of fulcrumed sections telescoping under frictional engagement, a spring compressed between said supplemental followers, and tending to spread the sections thereof, and cam-surfaces acting on the sections of the outermost supplemental followers and tending to force the same together when either of the followers is moved with respect to the other, substantially as described.

10. In a draft-rigging for cars, the combination of fixed abutments and coöperating followers, one of said followers having parallel friction-flanges, of a pair of telescoping frictionally-engaging supplemental followers made up of fulcrumed sections, friction-plates interposed between the sections of the outer supplemental follower and the parallel flanges of the one follower, said friction-plates having cam-surfaces acting on the said supplemental-follower sections to press the same together when one of the followers is moved with respect to the other, wedge-shaped spring-bases, acting on the fulcrumed ends of the supplemental-follower sections and tending to spread them, a spring compressed between said spring-bases, and another spring compressed between said divided supplemental followers, substantially as described.

11. The combination with the followers 8 and 9, the former having a fulcrum-ridge 17, and the latter having the friction-flanges $9^a$ and fulcrum-ridge 19, of the fulcrumed follower-sections 14, having the fulcrumed surfaces 18, engaging said fulcrum-ridge 17, the fulcrumed follower-sections 15 frictionally telescoping on said sections 14 and having the fulcrumed surfaces 20 engaging said fulcrum-ridge 19, a spring compressed between the follower-sections 14 and the follower-sections 15, and the friction-plates 30 interposed between said follower-sections 15 and the friction-flanges $9^a$ and subject to the follower 8, substantially as described.

12. In a draft-rigging, the combination of fixed abutments and pair of followers 8 and 9, the former having the fulcrum-ridge 17, and the latter having the fulcrum-ridge 19 and friction-flanges $9^a$, of the supplemental-follower sections 14 having the diverging fulcrum-surfaces 18 engaging said ridge 17, the supplemental-follower sections 15 having the fulcrumed surfaces 20 engaging said fulcrum-ridge 19, the friction-plates 30 interposed between said followers 15 and said friction-flanges $9^a$, said friction-plates having cam-surfaces acting on said followers 15 to force the same together under movements of either of the followers, wedge-shaped spring-seats engaging the fulcrumed ends of the said follower-sections 14 and 15, a spring compressed between said spring-bases, and another spring compressed directly between the follower-sections 14 and the follower-sections 15, said parts operating substantially as described.

13. The combination with a pair of primary followers, one thereof having frictional flanges, of a pair of divided supplemental followers telescoping one within the other, the outer member telescoping within the flanges of said flanged follower, said divided supplemental followers having beveled engagements with said primary followers whereby the sections thereof are put under strain tending to spread or separate them, and a spring compressed between said supplemental followers, substantially as described.

In testimony whereof I affix my signature in presence of two witnesses.

EDWIN C. WASHBURN.

Witnesses:
ELIZABETH H. KELIHER,
F. D. MERCHANT.